(12) United States Patent
Szabo, Jr. et al.

(10) Patent No.: US 8,610,356 B2
(45) Date of Patent: Dec. 17, 2013

(54) IODINE FUELED PLASMA GENERATOR SYSTEM

(75) Inventors: James J. Szabo, Jr., Bedford, MA (US); Bruce Pote, Sturbridge, MA (US); Surjeet Paintal, Somerville, MA (US); Michael Robin, Lincoln, RI (US); Vladimir Hruby, Newton, MA (US)

(73) Assignee: Busek Co., Inc., Natick, MA (US)

( * ) Notice: Subject to any disclaimer, the term of this patent is extended or adjusted under 35 U.S.C. 154(b) by 19 days.

(21) Appl. No.: 13/559,894

(22) Filed: Jul. 27, 2012

(65) Prior Publication Data
US 2013/0026920 A1 Jan. 31, 2013

Related U.S. Application Data

(60) Provisional application No. 61/574,123, filed on Jul. 28, 2011.

(51) Int. Cl.
*H01J 7/24* (2006.01)

(52) U.S. Cl.
USPC ............ 315/111.41; 315/111.21; 315/111.51; 315/111.11

(58) Field of Classification Search
USPC ............. 315/111.11, 111.21, 111.41, 111.51, 315/111.71
See application file for complete search history.

(56) References Cited

U.S. PATENT DOCUMENTS

| 6,049,557 A * | 4/2000 | Cunningham et al. .......... 372/59 |
| 6,609,363 B1 | 8/2003 | Dressler et al. |
| 2006/0042224 A1 * | 3/2006 | Shiao et al. .................. 60/203.1 |
| 2007/0113535 A1 * | 5/2007 | Shiao et al. .................. 60/203.1 |

OTHER PUBLICATIONS

Adam C Hillier, Revolutionizing Space Propulsion Through the characterization of Iodine as Fuel for Hall Effect Thrusters, Thesis for partial fulfillment Masters of Science in Astronautical Engineering, AFIT, Mar. 2011.*

* cited by examiner

*Primary Examiner* — Daniel Cavallari
*Assistant Examiner* — Srinivas Sathiraju
(74) *Attorney, Agent, or Firm* — Iandiorio Teska & Coleman, LLP

(57) ABSTRACT

An iodine fueled plasma generator system includes a plasma generator. At least one storage vessel is configured to store condensed phase iodine therein. A heating device proximate to the storage vessel is configured to create iodine vapor from the condensed phase iodine. A propellant management subsystem is configured to deliver the iodine vapor to the plasma generator. A feedback control subsystem is responsive to one or more of plasma generator discharge current, the pressure of the iodine vapor, and/or the temperature of the iodine vapor configured to regulate the flow rate of the iodine vapor to the plasma generator.

26 Claims, 6 Drawing Sheets

IODINE FUELED PLASMA GENERATOR SYSTEM

RELATED APPLICATIONS

This application claims benefit of and priority to U.S. Provisional Application Ser. No. 61/574,123 filed Jul. 28, 2011 under 35 U.S.C. §§119, 120, 363, 365, and 37 C.F.R. §1.55 and §1.78 incorporated herein by this reference.

GOVERNMENT RIGHTS

This invention was made with U.S. Government support under Contract No's. FA9453-10-M-0070 and FA9453-11-C-0017 awarded by the Air Force Research Laboratory (AFRL), and Contract No. FA8601-10-P-0510 awarded by the Air Force Institute of Technology. The Government may have certain rights in the subject invention.

FIELD OF THE INVENTION

This invention relates to an iodine fueled plasma generator system.

BACKGROUND OF THE INVENTION

Some conventional plasma generators, such as electrostatic thrusters, electromagnetic thrusters, and the like, operate almost exclusively on the noble gas Xenon (Xe). Xe is expensive and must be stored at high pressure in large cylindrically symmetric shaped high strength storage tanks which can compromise storage density.

Iodine is a halogen which is relatively reactive and much less expensive than xenon. Iodine can be stored at low pressure in smaller non-cylindrically symmetric shaped storage tanks. Iodine also has a higher thrust to power ratio than Xe at equivalent operating conditions. Iodine may also be collected at higher temperatures than Xe, making high power testing easier to accomplish. Thus, using Iodine as a propellant may increase storage density, improve performance, and reduce the cost of a plasma generator.

One conventional iodine electric propulsion thruster is disclosed in U.S. Pat. No. 6,609,363 to Dressler et al. As disclosed therein, iodine may be used as a propellant for Hall-effect thrusters and ion engines. The '363 patent relies on temperature controlled mass flow controller having a valve for flow control and shut-off to maintain a constant propellant flow rate. The '363 patent teaches the temperature controlled mass flow controller is maintained at the highest possible temperature. Thus, the '363 patent does not provide feedback to regulate the flow rate of the iodine gas to the thruster which may improve performance.

SUMMARY OF THE INVENTION

In one aspect, an iodine fueled plasma generator system is featured. The system includes a plasma generator, at least one storage vessel configured to store condensed phase iodine therein, a heating device proximate to the storage vessel configured to create iodine vapor from the condensed phase iodine, a propellant management subsystem configured to deliver the iodine vapor to the plasma generator, and a feedback control subsystem responsive to one or more of plasma generator discharge current, the pressure of the iodine vapor, and/or the temperature of the iodine vapor configured to regulate the flow rate of the iodine vapor to the plasma generator.

In one embodiment, the feedback control system may include a thermal throttle configured to regulate the flow rate of the iodine vapor to the plasma generator. The thermal throttle may be configured to use temperature to modulate the viscosity of the iodine vapor to regulate the flow rate of the iodine vapor to the plasma generator. The thermal throttle may be configured to change the phase of the iodine vapor to regulate the flow rate of the iodine vapor to the plasma generator. The feedback control system may be configured to utilize the heating device to change the pressure and temperature of the storage vessel to regulate the flow rate of the iodine vapor to the plasma generator. The system may include at least one accumulator vessel coupled to the at least one storage vessel. The feedback control system may be configured to transfer the iodine vapor from the storage vessel to the accumulator vessel. The shape of the storage vessel may include a non-cylindrically symmetric and/or conformal shape. The shape of the accumulator vessel may include a non-cylindrically symmetric shape and/or conformal shape. The condensed phase iodine may be solidified to maximize storage density. The condensed phase iodine may include a plurality of iodine crystals or liquid iodine. The plasma generator may include an electrostatic thruster or an electromagnetic thruster. The plasma generator may include an electron source. The plasma generator may include a cathode electron source. The cathode electron source may be fueled by iodine.

In another aspect, a method for fueling a plasma generator with iodine is featured. The method includes storing condensed phase iodine, heating the condensed phase iodine to create iodine vapor, delivering the iodine vapor to the plasma generator, and regulating the flow of the iodine vapor to the plasma generator based on feedback from one or more of discharge current from the plasma generator, the temperature of the iodine vapor and/or the pressure of the iodine vapor.

In one embodiment, the method may include the step of using temperature to modulate the viscosity of the iodine vapor to regulate the flow rate of the iodine vapor to the plasma generator. The method may include the step changing the phase of the iodine vapor to regulate the flow rate of the iodine vapor to the plasma generator. The method may include the step storing the condensed phase iodine in a non-cylindrically symmetric and/or conformal shaped vessel. The method may include providing an accumulator vessel. The method may include the step of storing deposited iodine in a non-cylindrically symmetric and/or conformal shaped accumulator vessel. The method may include the step transferring the iodine vapor from the storage vessel to the accumulator vessel. The method may include the step of heating the accumulator vessel to create iodine vapor. The method may include the step of heating the storage vessel at a temperature lower than the temperature of the accumulator vessel.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
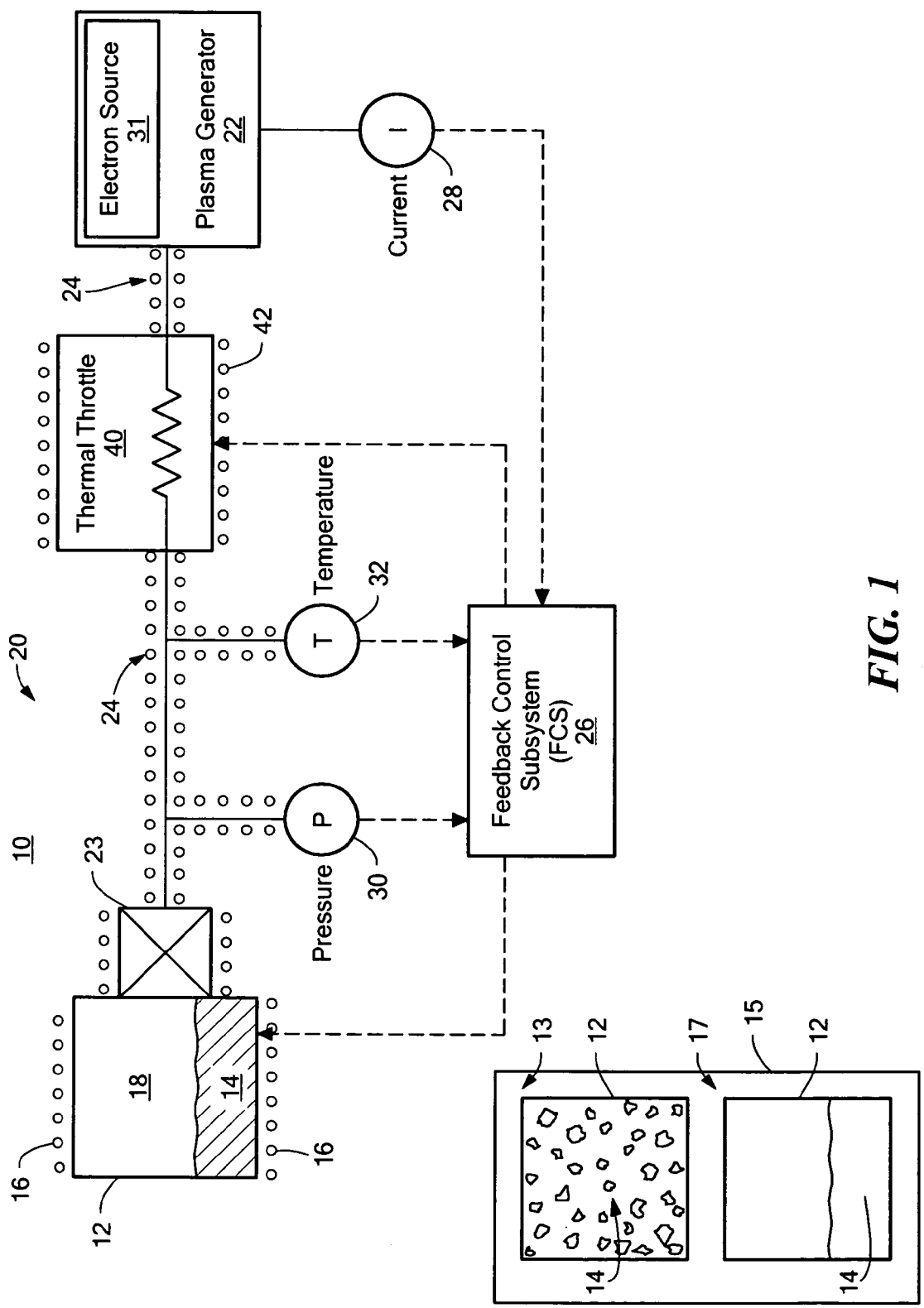
FIG. 1 is schematic block diagram showing the primary components of one embodiment of the iodine fueled plasma generator system of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, one embodiment of iodine fueled plasma generator system 10 of this invention. System 10 includes plasma generator 22 which may include electron source 31. System 10 also includes at least one storage vessel, e.g., storage vessel 12, configured to store condensed phased iodine 14 therein. In one example, condensed phased iodine 14 is solidified into a form which maximizes stored density, e.g., at least one solid block as shown. In other examples, condensed phased iodine 14 may be a plurality of iodine crystals, e.g., as shown at 13 in caption block 15 or liquid iodine, e.g., as shown at 17 in caption block 15. System 10 also includes heating device 16 located proximate storage vessel 12 which provides heat to storage vessel 12 to create iodine vapor 18 from condensed phased iodine 14, e.g., by sublimation or vaporization. Storage vessel 12 preferably stores the condensed phased iodine 14 at a low pressure, e.g. at about 0.05 atm absolute, or similar low pressure. Propellant management subsystem 20 is configured to deliver iodine vapor 18 to plasma generator 22. In one example, propellant management subsystem 20 may include heated line 24 between storage vessel 12 and plasma generator 22 which delivers iodine vapor 18 to plasma generator 22. Propellant management subsystem 20 may also include on-off valve 23 between storage vessel 12 and line 24 which may be used to turn the flow of iodine vapor from storage vessel 12 on and off.

Iodine fueled plasma generator system 10 also includes feedback control subsystem 26 which is responsive to one or more of plasma generator discharge current 28, pressure 30 of iodine vapor 18, and/or temperature 32 of iodine vapor 18, or any combination thereof, to regulate the flow rate of the iodine vapor 18 from storage vessel 12 to plasma generator 22. For example, in response to plasma discharge current 28, feedback control system 26 adjusts heating device 16 to change the temperature of storage vessel 12 to control the pressure therein which in turn regulates the flow rate of iodine vapor 18 to plasma generator 22. Similarly, in response to temperature 32 of iodine vapor 18 and/or pressure 30 of iodine vapor 18 in line 24, feedback control system 26 adjusts heating device 16 to change the temperature of storage vessel 12 to control the pressure therein which in turn regulates the flow rate of iodine vapor 18 in line 24 to plasma generator 22.

Feedback control subsystem 26 may also include thermal throttle 40 which preferably uses temperature to modulate the viscosity of iodine vapor 18 in line 24 to control the flow rate of iodine vapor 18 to plasma generator 22. In one example, thermal throttle 40 may include temperate modulating device 42, e.g., a heater, which heats iodine vapor 18 in line 24 which may increase its viscosity and change the flow rate of iodine vapor 18 to plasma generator 22. In another example, temperate modulating device 42, e.g., thermoelectric heat pump, or similar type device, cools iodine vapor 18 in line 24 to change its phase such that iodine vapor 18 undergoes deposition inside line 24 to reduce the flow rate of iodine vapor 18 to plasma generator 22. Similarly, temperate modulating device 42 may heat line 24 inside thermal throttle 40 to cause any deposited iodine inside line 24 to sublime thereby increasing the flow rate of iodine vapor 18 to plasma generator 22.

Feedback control system 26 may also utilize heating device 16 to change the pressure and temperature of storage vessel 12 to regulate the flow rate of iodine vapor 18 to plasma generator 22, e.g., heating device 16 may increase the temperature of storage vessel 12 which increases the pressure therein to increase the flow rate of iodine vapor 18 to plasma generator 22.

Figure 2:
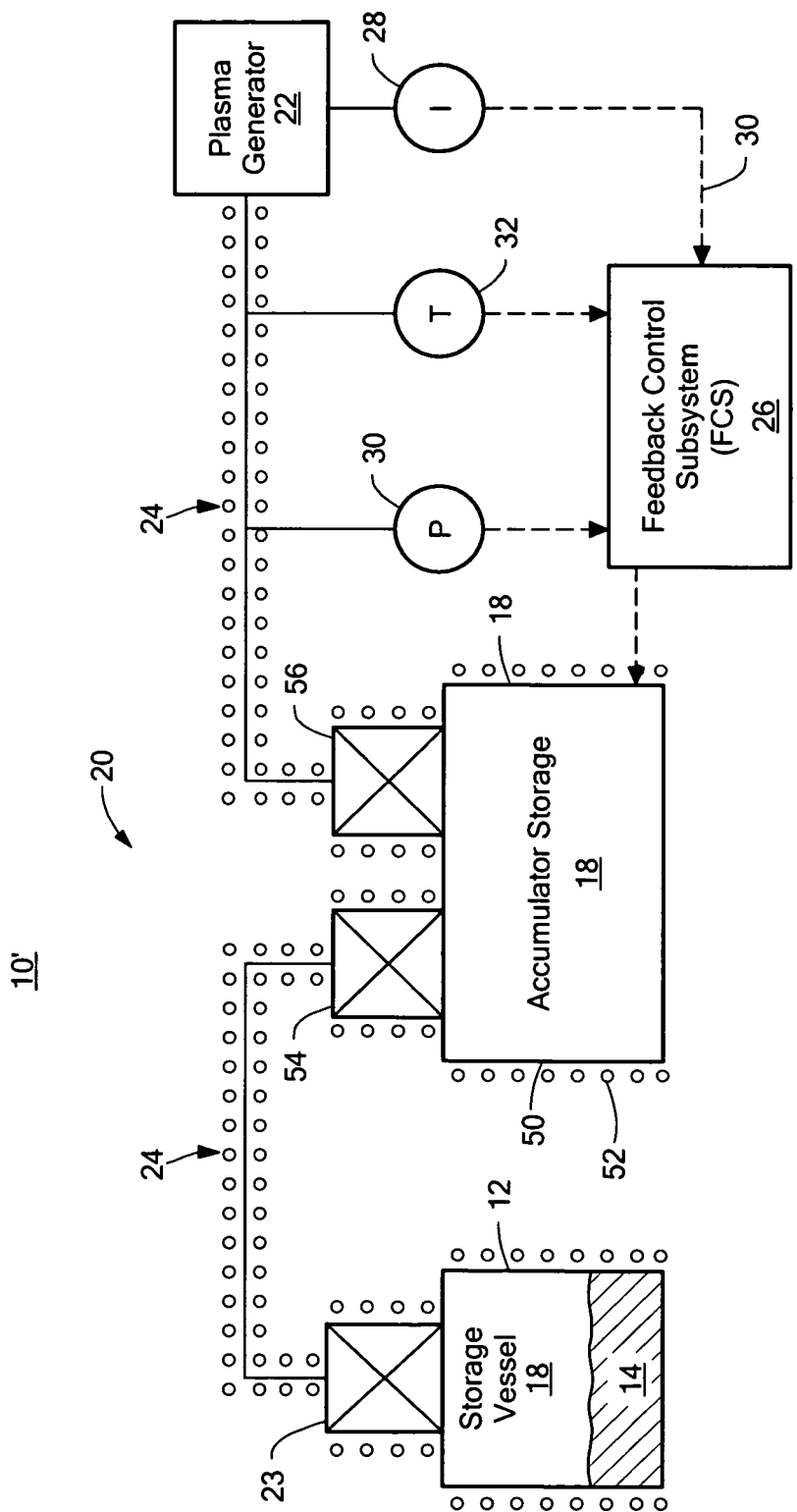
FIG. 2 is a schematic block diagram showing one example of a storage vessel and an accumulator vessel in accordance with one embodiment of this invention.

System 10, FIG. 2, where like parts have been given like numbers, may include storage vessel 12 and at least one accumulator storage vessel, e.g., accumulator storage vessel 50. In one example, propellant management subsystem 20 preferably transfers iodine vapor 18 from storage vessel 12 to accumulator vessel 50 via line 24. On-off valves 23 and 54 may be used to turn the flow of iodine vapor 18 from storage vessel 12 to accumulator vessel 50 off and one and on-off valve 56 may be used to turn the flow rate from accumulator vessel 50 to plasma generator 22 on and off. In one example, storage vessel 12 may be a large primary storage vessel that stores a large amount of condensed phased iodine, e.g., a geometric ton, or similar amount of condensed phase iodine needed for a particular spacecraft mission. Heating device 14 proximate storage vessel 12 may operate at a reduced temperature, e.g., about 40° C. or similar temperature, to create iodine vapor 18 which is transferred to accumulator storage vessel 50. Accumulator vessel 50 stores deposited iodine vapor 18 which may then be further heated by heating device 52 at a higher temperature, e.g., about 80° C. or similar temperature, to create iodine vapor 18 needed for plasma generator 22. Feedback control system 26 operates in a similar manner as discussed above to regulate the flow rate of the iodine vapor 18 from accumulator vessel 50 to plasma generator 22. Some advantages of utilizing accumulator storage vessel 40 may include saving power, distributing mass, spacecraft refueling, and spacecraft staging.

Figure 3:
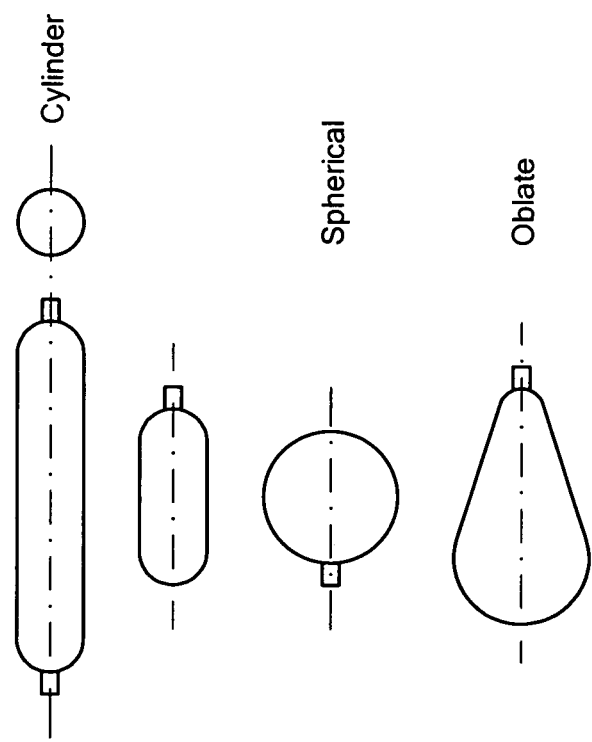
FIG. 3 depicts examples of conventional high pressure cylindrically symmetric shaped vessels.

Conventional plasma generator systems that utilize Xe as a propellant need to store the Xe at high pressure in cylindrically symmetric shaped vessels made of high strength materials, e.g., having the shapes shown in FIG. 3.

Figure 4:
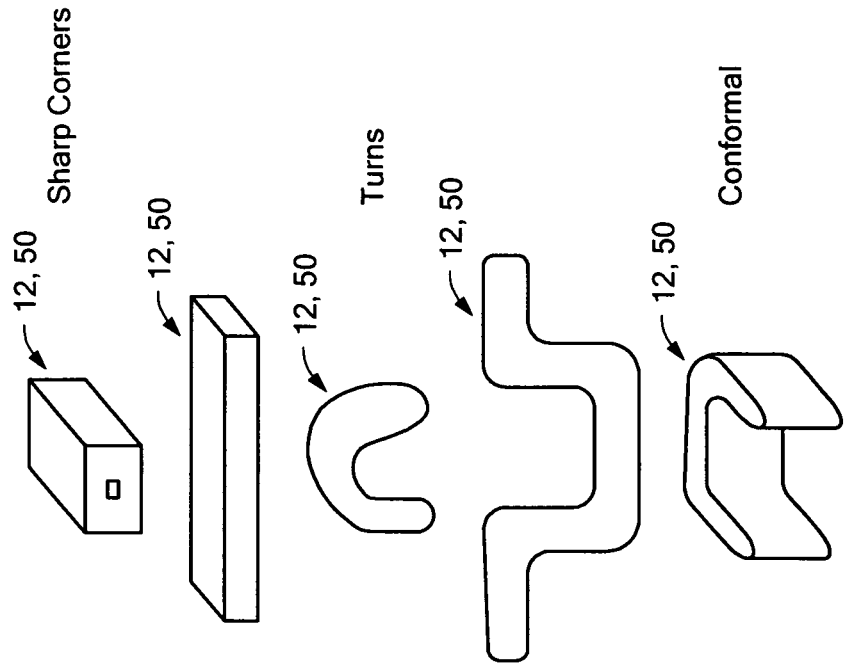
FIG. 4 depicts examples of low pressure non-cylindrically shaped vessels which may be utilized by the system shown in FIGS. 1-2.

Because iodine fueled plasma generator system 10, FIGS. 1-2, utilizes iodine as a propellant which can be stored at low temperature and pressure, storage vessel 12, FIGS. 1 and 2, and/or accumulator vessel 50, FIG. 2 may have a non-cylindrically symmetric shape, e.g., as shown in FIG. 4 and may be made of low strength materials, such as aluminum, plastic, Teflon, or similar type materials. Utilizing a non-cylindrically symmetric and/or conformal shaped storage vessel 12 and/or accumulator vessel 50 provides increased packing density of the condensed phase iodine 14 in plasma generator system 10.

Figure 5:
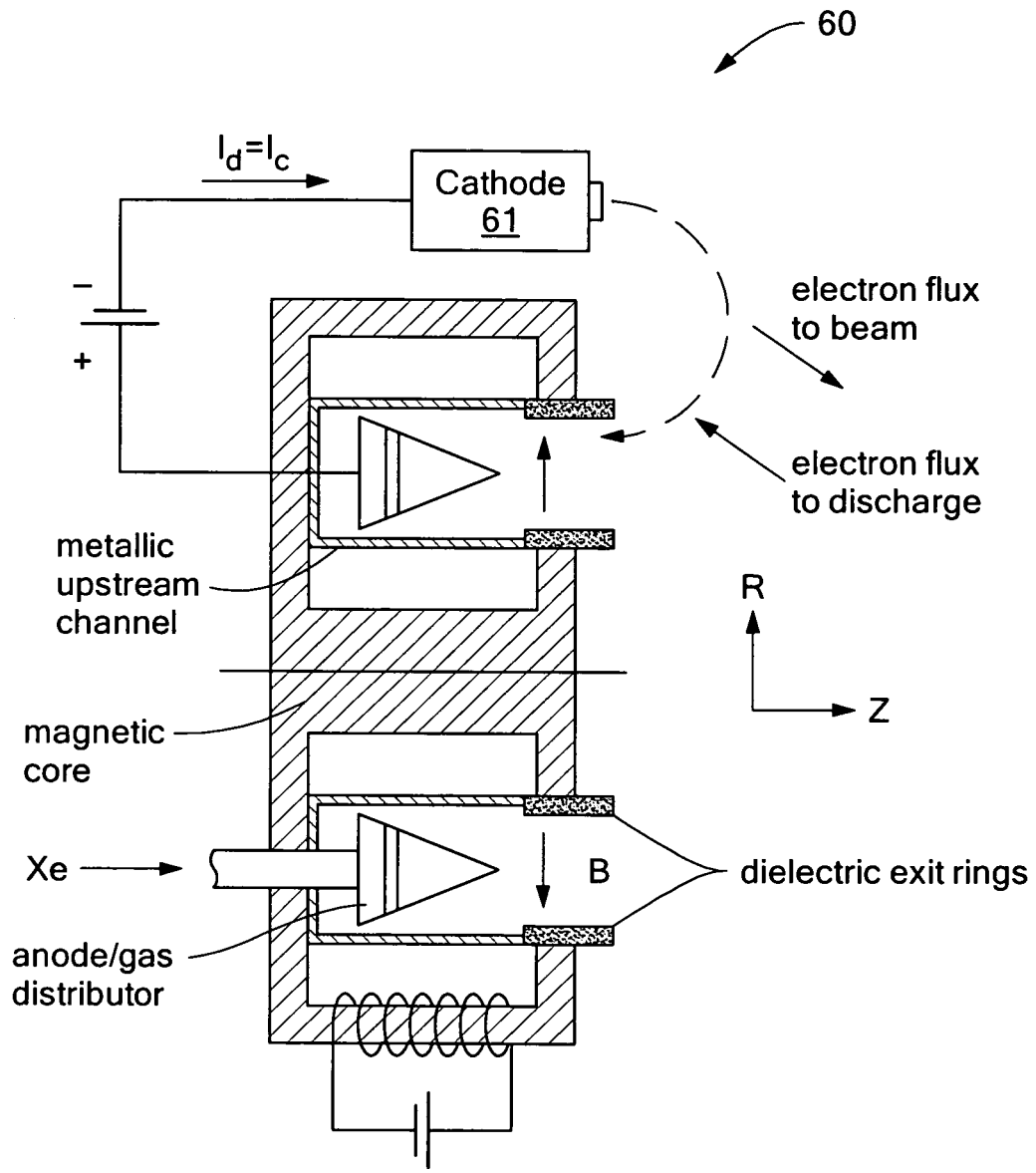
FIG. 5 is a schematic diagram showing one example of an electrostatic thruster.
Figure 6:
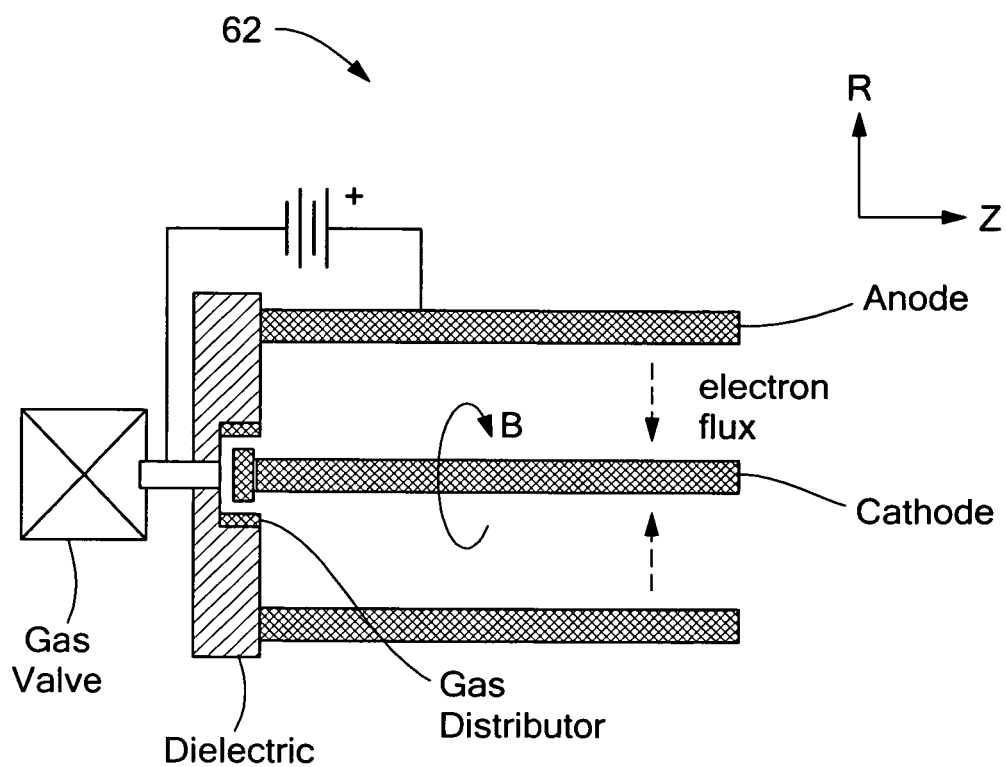
FIG. 6 is a schematic block diagram showing one example of an electromagnetic thruster in accordance with this invention.
Figure 7:
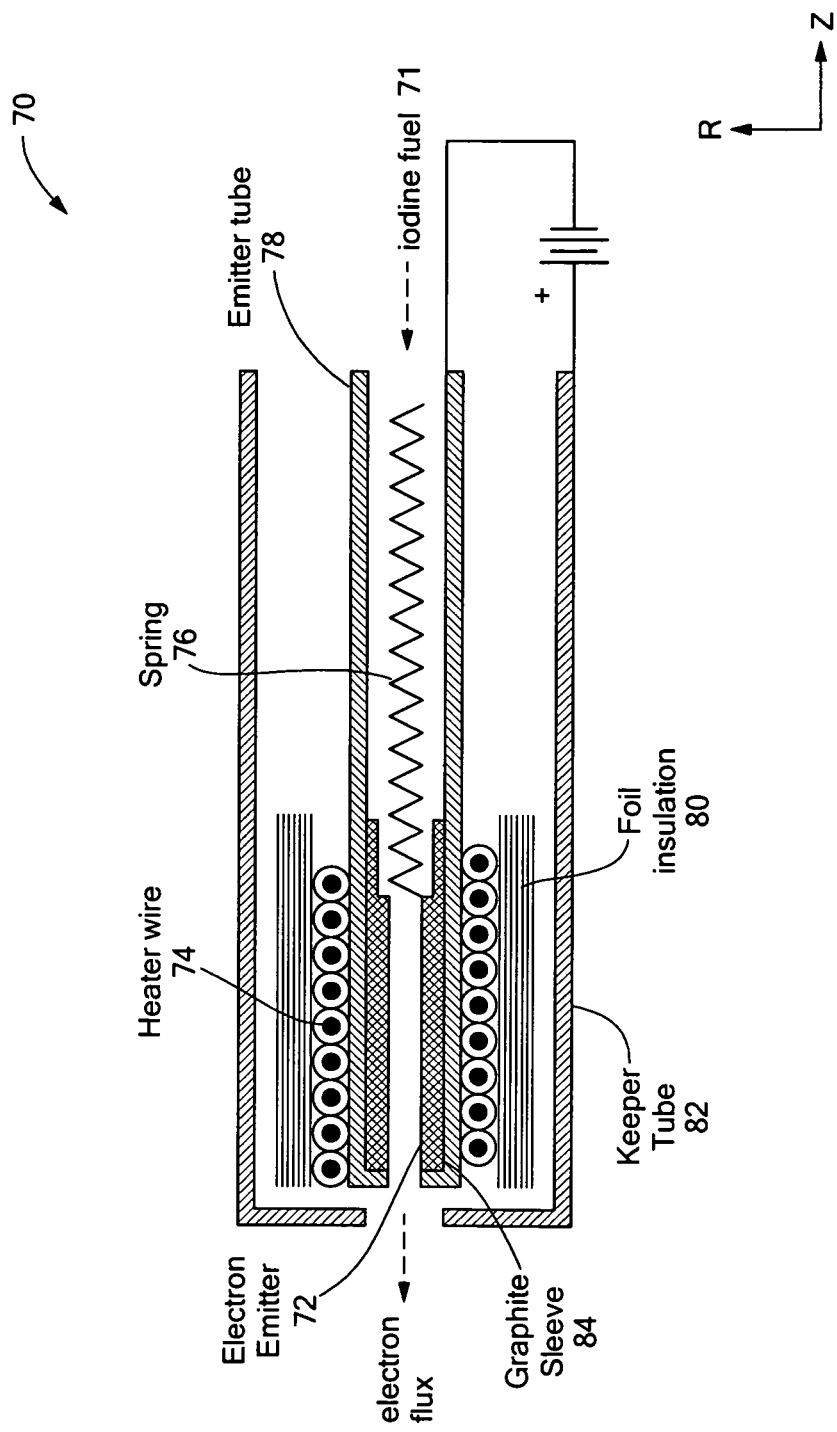
FIG. 7 is a schematic block diagram showing one example of a cathode electron source fueled by iodine in accordance with this invention.

Iodine fueled plasma generator system 10, FIGS. 1 and 2, may include an electrostatic thruster, e.g., electrostatic thruster 60, FIG. 5. In one example, the electrostatic thruster may include a Hall effect thruster, a gridded ion thruster, and similar type device. Plasma generator 10 may also include an electromagnetic thruster, e.g., electromagnetic thruster 62, FIG. 6. In one example the electromagnetic thruster may include magneto plasma dynamic thruster, a pulsed inductive thruster, a gas fed pulsed plasma thruster, a helicon double layer thruster, or similar type thruster.

In one example, electron source 31, FIG. 1, may be a cathode electron source, e.g., cathode electron source 61, FIG. 5. In another example, the cathode electron source may be a fueled by iodine, e.g., hollow cathode 70 fed by iodine fuel 71 with electron emitter 72, heater wire 74, spring 76, emitter tube 78, foil insulation 80, keeper tube 82, and graphite sleeve 84, or similar type cathode electron source which may or may not be necessarily hollow.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. An iodine fueled plasma generator system comprising:
   a plasma generator;
   at least one storage vessel configured to store condensed phase iodine therein;
   a heating device proximate to the storage vessel configured to create iodine vapor from the condensed phase iodine;
   a propellant management subsystem configured to deliver the iodine vapor to the plasma generator; and
   a feedback control subsystem responsive to one or more of plasma generator discharge current, the pressure of the iodine vapor, and/or the temperature of the iodine vapor configured to regulate the flow rate of the iodine vapor to the plasma generator.

2. The system of claim 1 in which the feedback control system includes a thermal throttle configured to regulate the flow rate of the iodine vapor to the plasma generator.

3. The system of claim 2 in which the thermal throttle is configured to use temperature to modulate the viscosity of the iodine vapor to regulate the flow rate of the iodine vapor to the plasma generator.

4. The system of claim 2 in which the thermal throttle is configured to change the phase of the iodine vapor to regulate the flow rate of the iodine vapor to the plasma generator.

5. The system of claim 1 in which the feedback control system is configured to utilize the heating device to change the pressure and temperature of the storage vessel to regulate the flow rate of the iodine vapor to the plasma generator.

6. The system of claim 1 further including at least one accumulator vessel coupled to the at least one storage vessel.

7. The system of claim 6 in which the feedback control system is configured to transfer the iodine vapor from the storage vessel to the accumulator vessel.

8. The system of claim 1 in which the shape of the storage vessel includes a non-cylindrically symmetric and/or conformal shape.

9. The system of claim 6 in which the shape of the accumulator vessel includes a non-cylindrically symmetric and/or conformal shape.

10. The system of claim 1 in which the condensed phase iodine is solidified to maximize storage density.

11. The system of claim 1 in which the condensed phase iodine includes a plurality of iodine crystals.

12. The system of claim 1 in which the condensed phase iodine includes liquid iodine.

13. The system of claim 1 in which the plasma generator includes an electrostatic thruster.

14. The system of claim 1 in which the plasma generator includes an electromagnetic thruster.

15. The system of claim 1 in which the plasma generator includes an electron source.

16. The system of claim 15 in which the plasma generator includes a cathode electron source.

17. The system of claim 16 in which the cathode electron source is fueled with iodine.

18. A method for fueling a plasma generator with iodine, the method comprising:
    storing condensed phase iodine;
    heating the condensed phase iodine to create iodine vapor;
    delivering the iodine vapor to the plasma generator; and
    regulating the flow of the iodine vapor to the plasma generator based on feedback from one or more of discharge current from the plasma generator, the temperature of the iodine vapor and/or the pressure of the iodine vapor.

19. The method of claim 18 further including the step of using temperature to modulate the viscosity of the iodine vapor to regulate the flow rate of the iodine vapor to the plasma generator.

20. The method of claim 18 further including the step changing the phase of the iodine vapor to regulate the flow rate of the iodine vapor to the plasma generator.

21. The method of claim 18 further including the step storing the condensed phase iodine in a non-cylindrically symmetric and/or conformal shaped vessel.

22. The method of claim 17 further including the step of providing an accumulator vessel.

23. The system of claim 22 further including the step of storing deposited iodine vapor in a non-cylindrically symmetrical and/or conformal shaped accumulator vessel.

24. The method of claim 22 further including the step transferring the iodine vapor from the storage vessel to the accumulator vessel.

25. The method of claim 22 further including the step of heating the accumulator vessel to create iodine vapor.

26. The method of claim 22 further including the step of heating the storage vessel at a temperature lower than the temperature of the accumulator vessel.

* * * * *